(12) United States Patent
Ahn et al.

(10) Patent No.: US 9,344,242 B2
(45) Date of Patent: *May 17, 2016

(54) METHOD AND APPARATUS FOR TRANSMITTING UPLINK

(71) Applicant: LG ELECTRONICS INC., Seoul (KR)

(72) Inventors: Joon Kui Ahn, Anyang-si (KR); Suck Chel Yang, Anyang-si (KR); Yun Jung Yi, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,810

(22) Filed: Nov. 12, 2014

(65) Prior Publication Data

US 2015/0071222 A1    Mar. 12, 2015

Related U.S. Application Data

(63) Continuation of application No. 14/112,209, filed as application No. PCT/KR2012/007887 on Sep. 28, 2012.

(60) Provisional application No. 61/541,044, filed on Sep.
(Continued)

(30) Foreign Application Priority Data

Sep. 27, 2012   (KR) .................. 10-2012-0108364

(51) Int. Cl.
*H04W 4/00*    (2009.01)
*H04L 5/00*    (2006.01)
(Continued)

(52) U.S. Cl.
CPC ............ *H04L 5/0048* (2013.01); *H04L 5/0037* (2013.01); *H04L 5/0051* (2013.01);
(Continued)

(58) Field of Classification Search
CPC ... H04L 5/0051; H04L 5/0048; H04L 5/0037; H04L 5/0053; H04W 52/146; H04W 52/367; H04W 52/32; H04W 52/325; H04W 56/0045; H04W 56/0005; H04W 72/0413; H04W 4/00
USPC .......................... 370/328–330, 436, 437, 478
See application file for complete search history.

(56) References Cited

U.S. PATENT DOCUMENTS

2010/0103902 A1   4/2010  Kim et al.
2011/0268028 A1*  11/2011 Stern-Berkowitz et al. .. 370/328
(Continued)

FOREIGN PATENT DOCUMENTS

EP    2 495 586 A1    9/2012
EP    2 536 227 A    12/2012
(Continued)

*Primary Examiner* — Peter Cheng
(74) *Attorney, Agent, or Firm* — Birch, Stewart, Kolasch & Birch, LLP

(57) ABSTRACT

A method, performed by a user equipment, is described for uplink transmission in a wireless communication system. A first time alignment (TA) to a first cell belonging to a first timing advance group (TAG) is performed. A second TA to a second cell belonging to a second TAG is performed. A determination is made as to whether to transmit or drop a sounding reference signal (SRS) on a subframe. The SRS is determined to be dropped based on whether the first and second TAGs are configured, whether at least one symbol of the subframe is used to transmit the SRS toward the second cell of the second TAG and also used to transmit a physical uplink shared channel (PUSCH) toward the first cell of the first TAG, and whether a total uplink transmission power exceeds a maximum value.

8 Claims, 13 Drawing Sheets

Related U.S. Application Data 29, 2011, provisional application No. 61/554,493, filed on Nov. 1, 2011, provisional application No. 61/591,279, filed on Jan. 27, 2012, provisional application No. 61/611,590, filed on Mar. 16, 2012, provisional application No. 61/613,467, filed on Mar. 20, 2012, provisional application No. 61/644,439, filed on May 9, 2012, provisional application No. 61/645,566, filed on May 10, 2012, provisional application No. 61/667,935, filed on Jul. 3, 2012, provisional application No. 61/678,120, filed on Aug. 1, 2012, provisional application No. 61/681,636, filed on Aug. 10, 2012.

(51) Int. Cl.
| | | |
|---|---|---|
| *H04W 52/14* | (2009.01) | |
| *H04W 52/36* | (2009.01) | |
| *H04W 72/04* | (2009.01) | |
| *H04W 56/00* | (2009.01) | |
| *H04W 52/32* | (2009.01) | |

(52) U.S. Cl.
CPC ........... *H04L5/0053* (2013.01); *H04W 52/146* (2013.01); *H04W 52/32* (2013.01); *H04W 52/367* (2013.01); *H04W 56/0005* (2013.01); *H04W 56/0045* (2013.01); *H04W 72/0413* (2013.01); *H04W 4/00* (2013.01); *H04W 52/325* (2013.01)

(56) References Cited

U.S. PATENT DOCUMENTS

| | | | |
|---|---|---|---|
| 2012/0008600 A1* | 1/2012 | Marinier et al. | 370/336 |
| 2012/0281653 A1 | 11/2012 | Park et al. | |
| 2013/0242911 A1* | 9/2013 | Heo et al. | 370/329 |

FOREIGN PATENT DOCUMENTS

| | | |
|---|---|---|
| KR | 10-2011-0081392 A | 7/2011 |
| KR | 10-2011-0093632 A | 8/2011 |
| WO | WO 2007/024791 A2 | 3/2007 |
| WO | WO 2007/125406 A2 | 11/2007 |
| WO | 2011/050743 A1 | 5/2011 |

\* cited by examiner

METHOD AND APPARATUS FOR TRANSMITTING UPLINK

CROSS-REFERENCE TO RELATED APPLICATIONS

This application is a continuation of co-pending U.S. patent application Ser. No. 14/112,209 filed on Oct. 16, 2013, which is the National Phase of PCT/KR2012/007887 filed on Sep. 28, 2012, which claims priority under 35 U.S.C. 119(e) to U.S. Application Nos. 61/541,044 filed on Sep. 29, 2011, 61/554,493 filed on Nov. 1, 2011, 61/591,279 filed on Jan. 27, 2012, 61/611,590 filed on Mar. 16, 2012, 61/613,467 filed on Mar. 20, 2012, 61/644,439 filed on May 9, 2012, 61/645,566 filed on May 10, 2012, 61/667,935 filed on Jul. 3, 2012, 61/678,120 filed on Aug. 1, 2012, 61/681,636 filed on Aug. 10, 2012, and under 35 U.S.C. 119(a) to Patent Application No. 10-2012-0108364 filed in the Republic of Korea on Sep. 27, 2012, all of which are hereby expressly incorporated by reference into the present application.

BACKGROUND OF THE INVENTION

1. Technical Field

The present invention disclosed herein relates to wireless communication, and more particularly, to a method and device for transmitting an uplink in a wireless communication system.

2. Background Art

The 3rd Generation Partnership Project (3GPP) long term evolution (LTE), which is an advanced version of Universal Mobile Telecommunications System (UMTS), is specified in the 3GPP release 8. The 3GPP LTE uses orthogonal frequency division multiple access (OFDMA) in a downlink and uses Single Carrier-frequency division multiple access (SC-FFDMA) in an uplink. The 3GPP LTE adopts MIMO with up to four antennas. Recently, 3GPP LTE-Advanced (LTE-A), which is an evolution of the 3GPP LTE, is under discussion.

As disclosed in 3GPP TS 36.211 V8.7.0 (2009-05) "Evolved Universal Terrestrial Radio Access (E-UTRA); Physical Channels and Modulation (Release 8)", a physical channel in the 3GPP LTE/LTE-A is divided into a downlink channel (i.e. Physical Downlink Shared Channel (PDSCH) and Physical Downlink Control Channel (PDCCH), and an uplink channel (i.e. Physical Uplink Shared Channel (PUSCH) and Physical Uplink Control Channel (PUCCH).

In order to reduce the interference caused by uplink transmission between terminals, it is important for a base station to maintain uplink time alignment for a terminal. A terminal may be located in an arbitrary area within a cell, and a reaching time (the time that an uplink signal transmitted by a terminal takes to reach a base station) may vary depending on the position of each terminal. The reaching time of a terminal located at a cell edge is longer than that of a terminal located at the middle of a cell. On the contrary, the reaching time of a terminal located at the middle of a cell is shorter than that of a terminal located at a cell edge.

In order to reduce the interference between terminals, it is necessary for a base station to arrange a schedule to allow uplink signals transmitted by terminals in a cell to be received within each time boundary. A base station is required to appropriately adjust the transmission timing of each terminal depending on the situation thereof, and this adjustment is called uplink time alignment. A random access process is a process for maintaining the uplink time alignment. A terminal obtains a time alignment value (or timing advance (TA)) through the random access process, and then, applies the time alignment value so as to maintain the uplink time alignment.

Recently, in order to provide a higher data transfer rate, a plurality of serving cells has been introduced. However, under the assumption that frequencies between serving cells are adjacent or propagation characteristics between serving cells are similar, the same time alignment value has been applied to all serving cells.

In existing wireless communication systems, uplink transmission is designed in consideration of only the same time alignment value. However, since serving cells having different propagation characteristics are allocated in some cases, uplink transmission needs to be designed in consideration of having different time alignment values between cells.

SUMMARY OF THE INVENTION

The present invention provides a method of transmitting an uplink between a plurality of timing advance (TA) groups, and a wireless device using the same.

In an aspect, a method of transmitting an uplink is provided. The method includes: transmitting a random access preamble through a first radio resource in a first serving cell; and transmitting an uplink channel through a second radio resource in a second serving cell, wherein the first serving cell belongs to a first Timing Advance (TA) group and the second serving cell belongs to a second TA group different from the first serving cell; and the first radio resource and the second radio resource overlap entirely or partially.

In the overlapped portion, a total transmit power may not exceed a configured maximum transmit power.

The uplink channel may include at least one of a Physical Uplink Shared Channel (PUSCH), a Physical Uplink Control Channel (PUCCH), and a sounding reference signal (SRS).

In another aspect, a radio device for transmitting an uplink is provided. The radio device includes: a radio frequency (RF) unit for transmitting and receiving a radio signal; and a processor connected to the RF unit, wherein the processor instructs the RF unit to transmit a random access preamble through a first radio resource in a first serving cell and instructs the RF unit to transmit an uplink channel through a second radio resource in a second serving cell; the first serving cell belongs to a first Timing Advance (TA) group and a second serving cell belongs to a second TA group different from the first TA group; and the first radio resource and the second radio resource overlap entirely and partially.

When a plurality of timing advance (TA) groups are configured, the ambiguity of the uplink transmission between each TA group can be reduced, and the maximum transmit power of a terminal can be prevented from being exceeded.

DETAILED DESCRIPTION OF THE INVENTION

A wireless device may be fixed or may have mobility, and may be referred to as another term such as a User Equipment (UE), a mobile station (MS), a user terminal (UT), a subscriber station (SS), or a mobile terminal (MT). In general, the base station may refer to a fixed station communicating with a wireless device, and also may be referred to as another term such as an evolved-NodeB (eNB), a Base Transceiver System (BTS), or an Access Point.

Hereinafter, it will be described that the present invention is applied based on 3rd Generation Partnership Project (3GPP) long term evolution (LTE) or 3GPP LTE-Advanced (LTE-A). This is for exemplary purposes, and the present invention may be applicable to various wireless communication systems. Hereinafter, LTE includes the LTE and/or the LTE-A.

Figure 1:
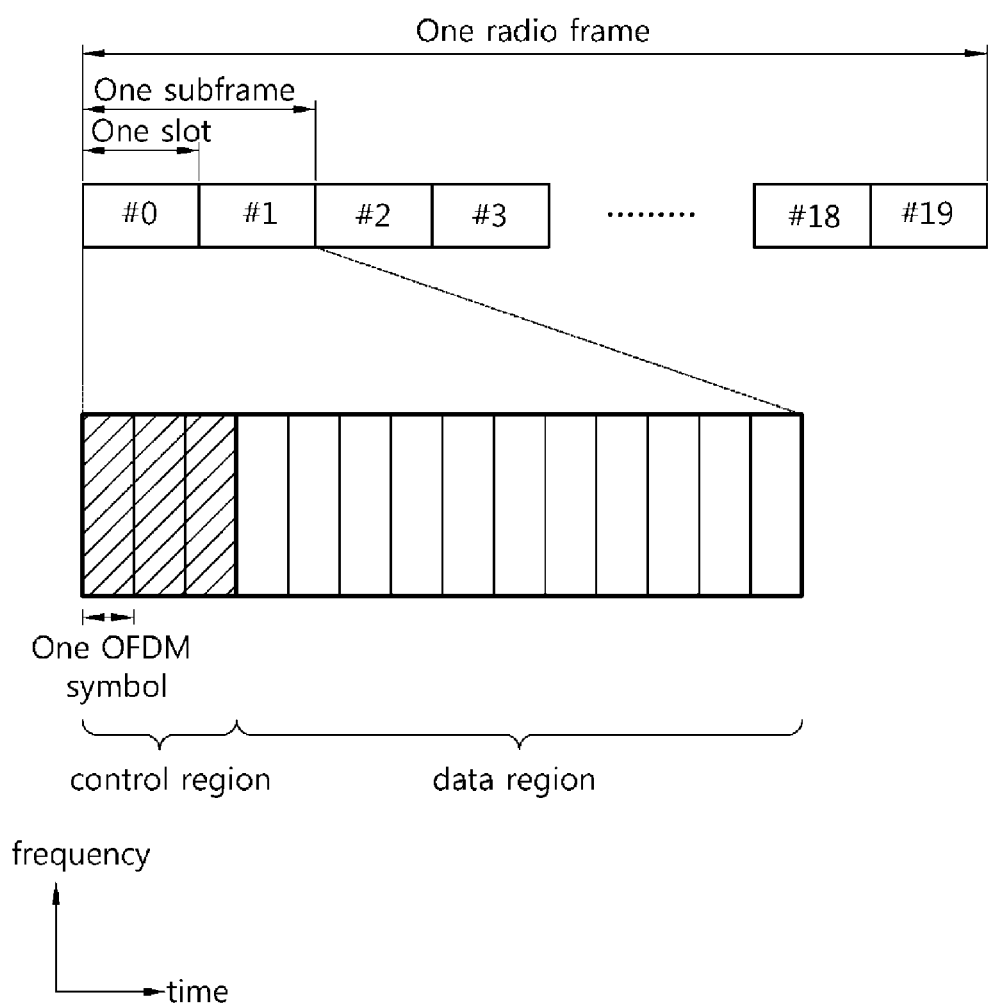
FIG. 1 illustrates a structure of a downlink radio frame in the 3 GPP LTE.

FIG. 1 illustrates a structure of a downlink radio frame in the 3GPP LTE. This may refer to paragraph 6 of 3GPP TS 36.211 V8.7.0 (2009-05) "Evolved Universal Terrestrial Radio Access (E-UTRA); Physical Channels and Modulation (Release 8)".

A radio frame includes 10 subframes numbered with indices 0 to 9. One subframe includes two consecutive slots. The time required to transmit one subframe is called a transmission time interval (TTI). For example, the length of one subframe may be 1 ms and the length of slot may be 0.5 ms.

One slot may include a plurality of orthogonal frequency division multiplexing (OFDM) symbols in a time zone. Since the 3GPP LTE uses orthogonal frequency division multiple access (OFDMA) in a downlink (DL), the OFDM symbol is only to express one symbol period in a time zone and thus does not limit a multiple access scheme or name. For example, the OFDM symbol may be called different names such as a single carrier-frequency division multiple access (SC-FDMA) symbol and a symbol period.

Although it is exemplarily described that one slot includes 7 OFDM symbols, the number of OFDM symbols in one slot may vary depending on the length of a Cyclic Prefix (CP). According to 3GPP TS 36.211 V8.7.0, one slot in a regular CP includes seven OFDM symbols and one slot in an extended CP includes six OFDM symbols.

A resource block (RB) is a resource allocation unit and includes a plurality of subcarriers in one slot. For example, if one slot includes seven OFDM symbols in a time zone and a RB includes twelve subcarriers in a frequency domain, one RB may include 7×12 resource elements (REs).

A DL subframe is divided into a control region and a data region in a time zone. The control region includes up to three OFDM symbols in the front of a first slot in a subframe, but the number of OFDM symbols in the control region may vary. A Physical Downlink Control Channel (PDCCH) and another control channel are allocated to the control region and a PDSCH is allocated to the data region.

As disclosed in 3GPP TS 36.211 V8.7.0, a physical channel in the 3GPP LTE may be divided into a data channel (i.e. a Physical Downlink Shared Channel (PDSCH) and a Physical Uplink Shared Channel (PUSCH)) and a control channel (i.e. a Physical Downlink Control Channel (PDCCH), a Physical Control Format Indicator Channel (PCFICH), a Physical Hybrid-ARQ Indicator Channel (PHICH), and a Physical Uplink Control Channel (PUCCH)).

The PCFICH transmitted from the first OFDM symbol of a subframe carries a control format indicator (CFI) for the number of OFDM symbols (i.e. the size of a control region) used for the transmission of control channels in the subframe. A terminal receives the CFI first on the PCFICH and then monitors the PDCCH.

Unlike the PDCCH, the PCFICH does not use blind decoding and is transmitted through the fixed PCFICH resource of a subframe.

The PHICH carries a positive-acknowledgement (ACK)/negative-acknowledgement (NACK) signal for a hybrid automatic repeat request (HARQ). The ACK/NACK signal for uplink (UL) data on the PUSCH, which is transmitted by a terminal, is transmitted on the PHICH.

A Physical Broadcast Channel (PBCH) is transmitted from the front four OFDM symbols of the second slot in the first subframe of a radio frame. The PBCH carries system information essential when a terminal communicates with a base station, and the system information transmitted through the PBCH is called a master information block (MIB). Compared to this, the system information, which is transmitted on the PDSCH indicated by the PDCCH, is called a system information block (SIB).

The control information transmitted through the PDCCH is called as downlink control information (DCI). The DCI may include the resource allocation of a PDSCH (also, referred to as DL grant), the resource allocation of a PUSCH (also, referred to as UL grant), a set of transmit power control commands on each UE in an arbitrary UE group, and/or the activation of a Voice over Internet Protocol (VoIP).

The 3GPP LTE uses blind decoding to detect a PDCCH. The blind decoding demasks a desired identifier on CRC of a received PDCCH (also, referred to as a candidate PDCCH), and checks CRC errors in order to confirm whether a corresponding PDCCH is its control channel.

A base station determines a PDCCH format according to DCI to be transmitted to a terminal, attaches Cyclic Redundancy Check (CRC) to the DCI, and then, masks a unique identifier (also, referred to as a Radio Network Temporary Identifier (RNTI)) on the CRC according to the owner or purpose of a PDCCH.

The control region in a subframe includes a plurality of control channel element (CCEs). The CCE is a logical allocation unit used to provide an encoding rate according to a state of a radio channel to a PDCCH and corresponds to a plurality of resource element groups (REGs). The REG includes a plurality of resource elements. According to a linkage between the number of CCEs and an encoding rate provided by the CCEs, the format of a PDCCH and the number of available bits in the PDCCH are determined.

One REG includes four REs and one CCE includes nine REGs. In order to configure one PDCCH, {1, 2, 4, and 8} CCEs may be used and an element of each of {1, 2, 4, and 8} CCEs is referred to as a CCE aggregation level.

A base station determines the number of CCEs used for the transmission of a PDDCH according to a channel state. For example, one CCE may be used for PDCCH transmission to a terminal having a good DL channel state. Eight CCEs may be used for PDCCH transmission to a terminal having a poor DL channel state.

A control channel configured with one or more CCE performs interleaving by a REG unit, and after a cell identifier (ID) based cyclic shift is performed, is mapped into a physical resource.

According to 3GPP TS 36.211 V8.7.0, a DL channel includes a PUSCH, a PUCCH, a Sounding Reference Signal (SRS), and a Physical Random Access Channel (PRACH).

The PUCCH supports a multi-format. According to a modulation scheme depending on the PUCCH format, a PUCCH having the different number of bits per subframe may be used. A PUCCH format 1 is used for the transmission of a Scheduling Request (SR), a PUCCH format 1a/ab is used for the transmission of an ACK/NACK signal for a HARQ, a PUCCH format 2 is used for the transmission of a CQI, and a PUCCH format 2a/2b is used for the simultaneous transmission of CQI and an ACK/NACK signal. When only the ACK/NACK signal is transmitted in a subframe, the PUCCH format 1a/1b is used, and when the SR is transmitted alone, the PUCCH format 1 is used. When the SR and ACK/NACK are simultaneously transmitted, the PUCCH format 1 is used, and an ACK/NACK signal is modulated and transmitted in a resource allocated to the SR.

Hereinafter, Sounding Reference Signal (SRS) transmission will be described.

The SRS transmission is divided into periodic SRS transmission and aperiodic SRS transmission. The periodically transmitted SRS is transmitted in a subframe triggered by a periodic SRS configuration. The periodic SRS configuration includes an SRS periodicity and an SRS subframe offset. Once a periodic SRS configuration is given, a terminal may transmit an SRS periodically in a subframe that satisfies the periodic SRS configuration.

The aperiodically transmitted SRS means an SRS is transmitted when an SRS request of a base station is detected. In order for the aperiodic SRS transmission, an SRS configuration is given in advance. The SRS configuration also includes an SRS periodicity TSRS and an SRS subframe offset TOffset.

An SRS request for triggering the aperiodic SRS transmission may be included in a DL grant or a UL grant on a PDCCH. For example, if an SRS request is one bit, '0' represents a negative SRS request and '1' represents a positive SRS request. If an SRS request is two bits, '00' represents a negative SRS request and the remaining represents a positive SRS request. However, one of a plurality of SRS configurations for SRS transmission may be selected.

If a DL grant or a UL grant does not include a CI, a SRS may be transmitted to a serving cell of a PDCCH, where an SRS request is detected. If a DL grant or a UL grant includes a CI, an SRS may be transmitted to a serving cell indicated by the CI.

It is assumed that a positive SRS request is detected in a subframe n of a serving cell c. When a positive SRS request is detected, an SRS is transmitted in the first subframe that satisfies n+k, k≥4 and TSRS>2 in Time Division Duplex (TDD) and (10*nf+kSRS−Toffset) mod TSRS=0 in Frequency Division Duplex (FDD). In the FDD, a subframe index kSRS is {0, 1, . . . , 9} in a frame nf. In the TDD, a subframe index kSRS is defined in a predetermined table. In the TDD where TSRS=2, an SRS is transmitted from the first subframe that satisfies (kSRS−Toffset)mod 5=0.

Hereinafter, a subframe in which an SRS is transmitted is referred to as an SRS subframe or a triggered subframe. In the periodic SRS transmission and the aperiodic SRS transmission, an SRS may be transmitted in a UE-specific SRS subframe.

The position of an OFDM symbol in which an SRS is transmitted may be fixed in an SRS subframe. For example, an SRS may be transmitted in the last OFDM symbol of an SRS subframe. The OFDM symbol in which an SRS is transmitted is called a sounding reference symbol.

Hereinafter, maintaining UL time alignment in the 3GPP LTE will be described.

In order to reduce the interference caused by UL transmission between terminals, it is important for a base station to maintain UL time alignment of a terminal. A terminal may be located in an arbitrary area within a cell, and the reaching time that an uplink signal that a terminal transmits takes time to reach a base station may vary depending on the position of each terminal. The reaching time of a terminal located at a cell edge is longer than that of a terminal located at the middle of a cell. On the contrary, the reaching time of a terminal located at the middle of a cell is shorter than that located at a cell edge.

In order to reduce the interference between terminals, it is necessary for a base station to arrange a schedule to allow UL signals that terminals in a cell transmit to be received within each time boundary. A base station is required to appropriately adjust the transmission timing of each terminal depending on the situation thereof, and this adjustment is called time alignment maintenance.

One method of managing time alignment includes a random access process. A terminal transmits a random access preamble to a base station. The base station calculates a time alignment value for fast or slow transmission timing of the terminal on the basis of the received random access preamble. Then, the base station transmits a random access response including the calculated alignment value to the terminal. The terminal updates the transmission timing by using the time alignment value.

As another method, a base station receives an SRS periodically or arbitrarily from a terminal, calculates a time alignment value of the terminal through the SRS, and then, notifies it to the terminal through a MAC control element (CE).

The time alignment value is information transmitted from a base station to a terminal in order to maintain UL time alignment, and a Timing Alignment Command indicates the information.

In general, since a terminal has mobility, the transmission timing of the terminal may vary according to the moving speed and position of the terminal. Accordingly, the time alignment value that the terminal receives may be effective for a specific time. For this, a Time Alignment Timer is used.

After receiving a time alignment value from a base station and then updating time alignment, a terminal starts or restarts a time alignment timer. Only when the time alignment timer operates, UL transmission is available in the terminal. A value of the time alignment timer may be notified from a base station to a terminal through system information or an RRC message such as a Radio Bearer Reconfiguration message.

When the time alignment timer expires or does not operate, under the assumption that a base station is out of time alignment, a terminal does not transmit any UL signal except for a random access preamble.

Figure 2:
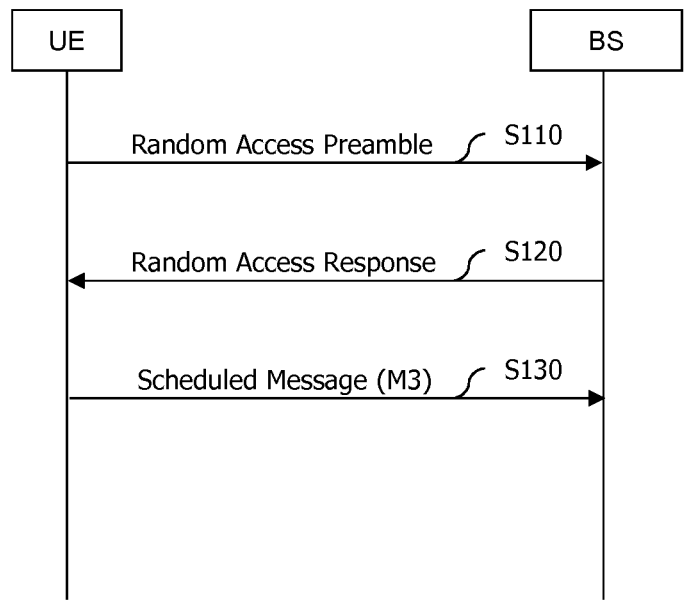
FIG. 2 is a flowchart illustrating a random access process in 3GPP LTE.

FIG. 2 is a flowchart illustrating a random access process in 3GPP LTE. The random access process is used for a terminal to obtain UL alignment with a base station or to receive a UL radios resource allocated.

A terminal receives a root index and a physical random access channel (PRACH) configuration index from a base station. Each includes 64 candidate random access preambles defined by a Zadoff-Chu (ZC) sequence, and the root index is a logical index for a terminal to generate the 64 candidate random access preambles.

The transmission of a random access preamble is limited to a specific time and a frequency resource in each cell. The PRACH configuration index indicates a specific subframe and a preamble format available for the transmission of a random access preamble.

Table 1 below is one example of a random access configuration disclosed in paragraph 5.7 of 3GPP TS 36.211 V8.7.0 (2009-05).

TABLE 1

| PRACH configuration index | Preamble format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

A terminal transmits an arbitrarily-selected random access preamble to a base station in operation S110. The terminal selects one of 64 candidate random access preambles. Then, the terminal selects a subframe corresponding to a PRACH configuration index. The terminal transmits the selected random access preamble in the selected subframe.

The base station receiving the random access preamble transmits a random access response (PAR) to the terminal in operation S120. The random access response is detected in two steps. First, the terminal detects a PDCCH masked with random access (RA)-RNTI. The terminal receives a random access response in a Medium Access Control (MAC) Protocol Data Unit (PDU) on a PDSCH indicated by the detected PDCCH.

Figure 3:
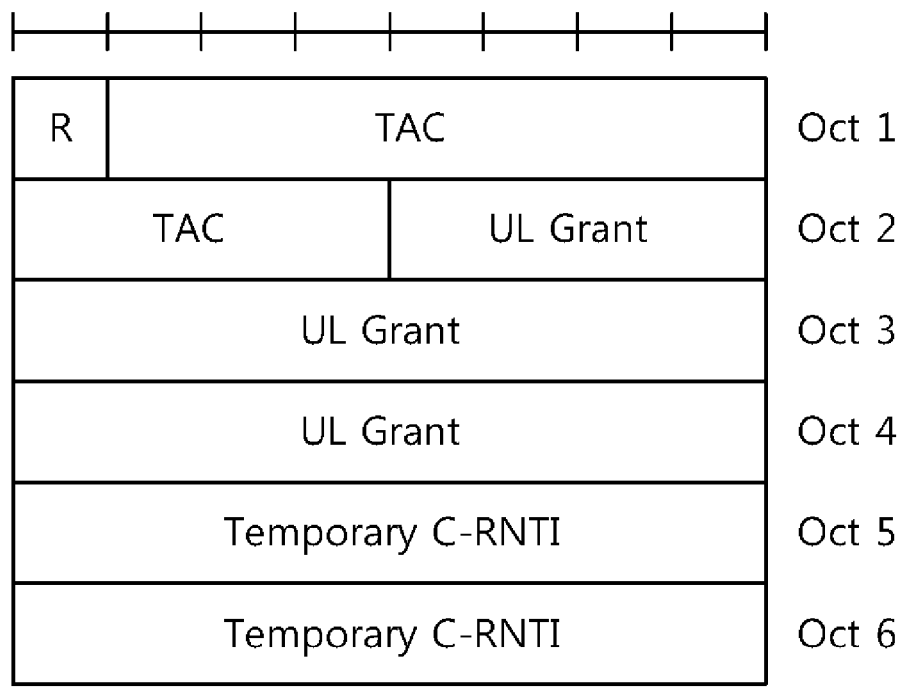
FIG. 3 illustrates a random access response.

FIG. 3 is a view of a random access response.

The random access response may include TAC, UL grant, and temporary C-RNTI.

The TAC is information indicating a time alignment value transmitted from a base station to a terminal in order to maintain UL time alignment. The terminal updates the UL transmission timing by using the time alignment value. Once updating the time alignment, the terminal starts or restarts a Time Alignment Timer.

The UL grant includes UL resource allocation and a transmit power command (TPC), which are used for the transmission of a scheduling message that will be described later. The TPC is used for determining transmit power for a scheduled PUSCH.

Referring to FIG. 2 again, the terminal transmits a message, which is scheduled according to the UL grant in the random access response, to the base station in operation S130.

Hereinafter, a random access preamble may be referred to as a message M1, a random access response may be referred to as a message M2, and a scheduled message may be referred to as a message M3.

From now on, referring to paragraph 5 of 3GPP TS 36.213 V8.7.0 (2009-05), UL transmit power in 3GPP LTE will be described.

A transmit power $P_{PUSCH}(i)$ for PUSCH transmission in a subframe i is defined as follows.

$$P_{PUSCH}(i) = \min\{P_{CMAX}, 10\log_{10}(M_{PUSCH}(i)) + P_{O\_PUSCH}(j) + \alpha(j)PL + \Delta_{TF}(i) + f(i)\}$$ [Equation 1]

where PCMAX is configured terminal transmit power and $M_{PUSCH}(i)$ is a bandwidth of PUSCH resource allocation of an RB unit. $P_{O\_PUSCH}(j)$ is a parameter consisting of the sum of a cell specific factor given in an upper layer PO_NOMINAL_PUSCH(j) and a terminal specific factor PO_UE_PUSCH(j) when j=0 and 1. $\alpha(j)$ is a parameter given in an upper layer. PL is path loss estimation calculated by a terminal $\Delta TF(i)$ is a terminal specific parameter. f(i) is a terminal specific value obtained from TPC. min {A,B} is a function for outputting a smaller value of A and B.

A transmit power $P_{PUCCH}(i)$ for PUCCH transmission in a subframe i is defined as follows.

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$ [Equation 2]

where PCMAX and PL are the same as those in Equation 1. PO_PUCCH(j) is a parameter consisting of the sum of a cell specific factor given in an upper layer PO_NOMINAL_PUCCH(j) and a terminal specific factor PO_UE_PUCCH(j). h(nCQI, nHARQ) is a value dependent on a PUCCH format. ΔF_PUCCH(F) is a parameter given by an upper layer. g(i) is a terminal specific value obtained from TPC.

A transmit power $P_{SRS}(i)$ for SRS transmission in a subframe i is defined as follows.

$$P_{SRS}(i) = \min\{P_{CMAX}, P_{SRS\_OFFSET} + 10\log_{10}(M_{SRS}) + P_{O\_PUSCH}(j) + \alpha(j)PL + f(i)\}$$ [Equation 3]

where PCMAX, PO_PUSCH(j), α(j), PL and f(i) are the same as those in Equation 1. PSRS_OFFSET represents a terminal specific parameter given in an upper layer, and MSRS represents a bandwidth for SRS transmission.

Hereinafter, a multiple carrier system will be described.

A 3GPP LTE system supports the case that a DL bandwidth and a UL bandwidth are configured differently, but this requires one component carrier (CC). The 3GPP LTE system supports up to 20 MHz, and supports only one CC to each of UL and DL when a UL bandwidth and a DL bandwidth are different.

Spectrum aggregation (or, referred to as bandwidth aggregation and carrier aggregation) supports a plurality of CCs. For example, if five CCs are allocated as granularity of a carrier unit having a 20 MHz bandwidth, the 3GPP LTE system may support the maximum bandwidth of 100 Mhz One DL CC or a pair of a UL CC and a DL CC may correspond to one cell. Accordingly, a terminal communicating with a base station through a plurality of DL CCs may receive service from a plurality of serving cells.

Figure 4:
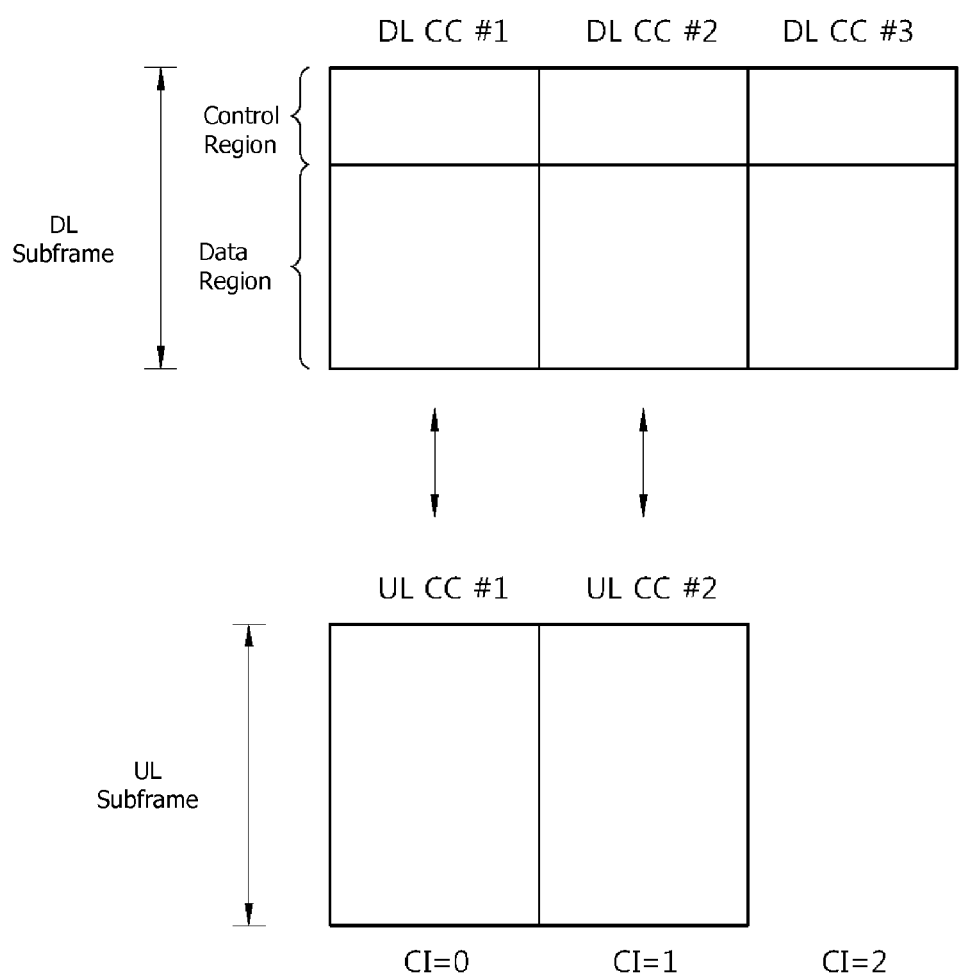
FIG. 4 illustrates an example of a multiple carrier.

FIG. 4 illustrates an example of a multiple carrier.

There are three DL CCs and three UL CCs, but their numbers are not limited thereto. In each DL CC, a PDCCH and a PDSCH are separately transmitted, and in each UL CC, a PUCCH and a PUSCH are separately transmitted. Since three pairs of DL CCs-UL CCs are defined, a terminal may receive service from three serving cells.

A terminal may monitor a PDCCH in a plurality of DL CCs, and simultaneously may receive a DL transmission block through a plurality of DL CCs. A terminal may transmit a plurality of UL transmission blocks simultaneously through a plurality of UL CCs.

It is assumed that a pair of DL CC #1 and UL CC #1 becomes a first serving cell, a pair of DL CC #2 and UL CC #2 becomes a second cell, and a DL CC #3 becomes a third serving cell. Each serving cell may be identified through a Cell index (CI). The CI may be unique in a cell or UE-specific. Here, the example that CI=0, 1, 2 are assigned to the first to third serving cells is shown in FIG. 4.

The serving cell may be divided into a primary cell pcell and a secondary cell scell. The primary cell operates in a primary frequency, and is a cell designated as a primary cell when a terminal performs an initial connection establishing process or starts a connection re-establishing process, or performs a hand-over process. The primary cell is also called a reference cell. The secondary cell may operate in a secondary frequency, may be configured after RRC connection is established, and may be used for providing an additional radio resource. At least one primary cell is always configured, and a secondary cell may be added/edited/released by an upper layer signaling (for example, an RRC message).

The CI of a primary cell may be fixed. For example, the lowest CI may be designated as the CI of a primary cell. Hereinafter, the CI of a primary cell is 0 and the CI of a secondary cell is sequentially allocated from 1.

A terminal may monitor a PDCCH through a plurality of serving cells. However, even when there are N number of serving cells, a base station may be configured to monitor a PDCCH for the M (M≤N) number of serving cells. Additionally, a base station may be configured to first monitor a PDCCH for the L (L≤M≤N) number of serving cells.

Even if a terminal supports a plurality of serving cells in an existing 3GPP LTE, one Timing Alignment (TA) value may be commonly applied to a plurality of serving cells. However, a plurality of serving cells are greatly far from a frequency domain, so that their propagation characteristics may vary. For example, in order to expand coverage or remove coverage hole, a Remote Radio Header (RRH) and devices may exist in an area of a base station.

Figure 5:
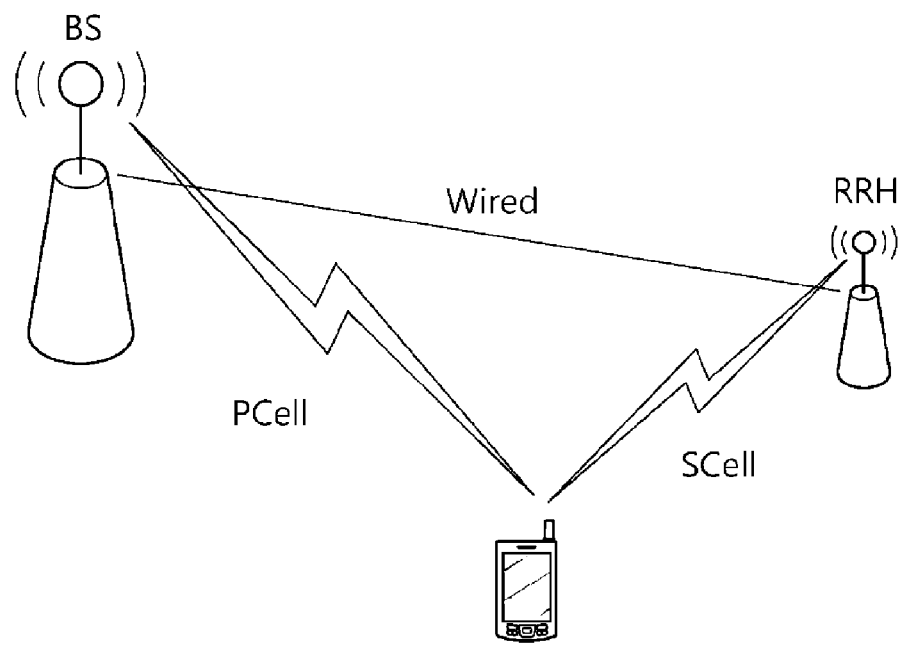
FIG. 5 illustrates a UL propagation difference between a plurality of cells.

FIG. 5 illustrates a UL propagation difference between a plurality of cells.

A terminal receives service through a primary cell and a secondary cell. The primary cell provides service by a base station and the secondary cell provides service by an RRH connected to a base station. The propagation delay characteristics of the primary cell and the secondary cells may vary due to the reasons such as the distance between a base station and an RRH and a processing time of an RRH.

In this case, when the same TA value is applied to the primary cell and the secondary cell, it may have a significant impact on the alignment of a UL signal.

Figure 6:
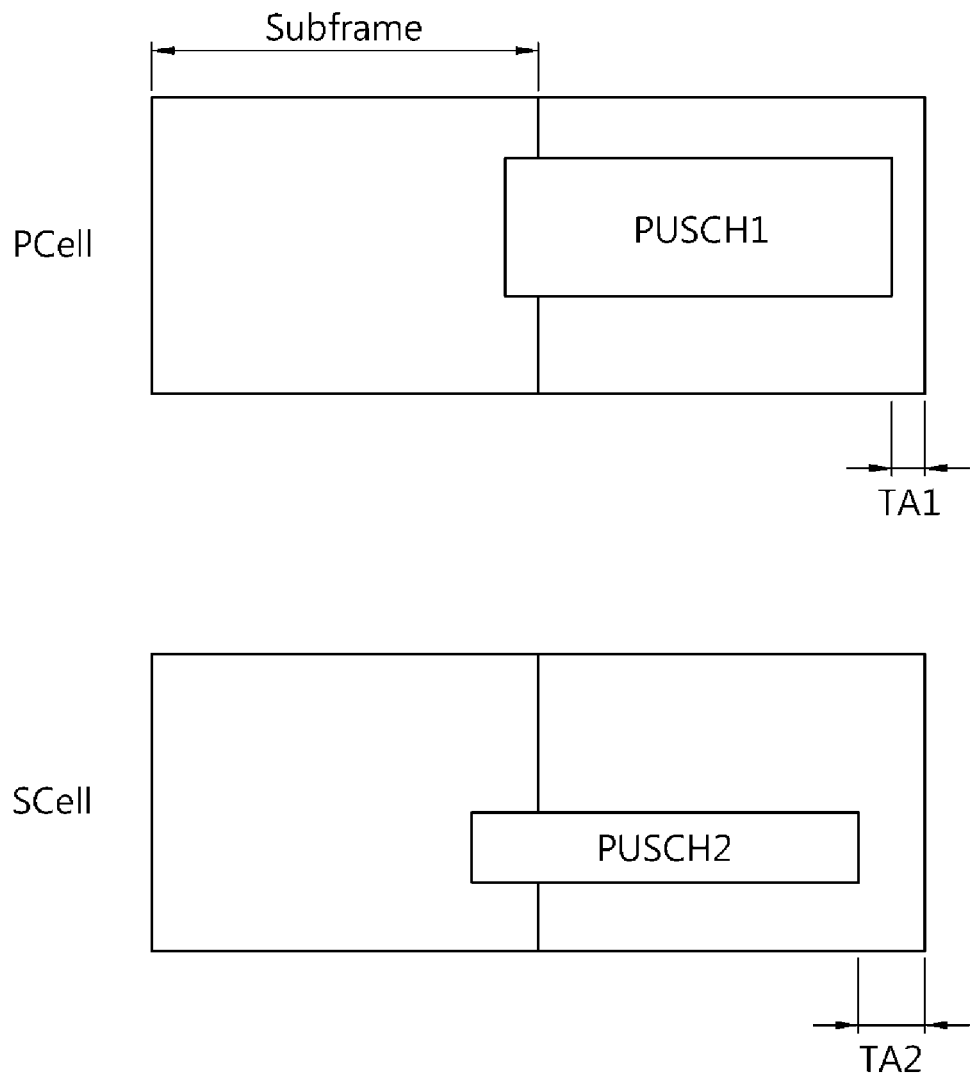
FIG. 6 illustrates an example of when a TA between a plurality of cells is changed.

FIG. 6 illustrates an example of when a TA between a plurality of cells is changed.

An actual TA of a primary cell is 'TA 1' and an actual TA of a secondary cell is 'TA 2'. Accordingly, it is necessary that a separate TA should be applied to each serving cell.

In order to apply a separate TA, a TA group is defined. The TA group includes one or more cells to which the same TA is applied. TA is applied by each TA group, and a time alignment timer operates by each TA group.

Hereinafter, in consideration of two serving cells (i.e. a first serving cell and a second serving cell), a first serving cell belongs to a first TA group and a second serving cell belongs to a second TA group. The numbers of serving cells and TA groups are for exemplary purposes only. The first serving cell may be a primary or secondary cell, and the second serving cell may be a primary or secondary cell.

A TA group may include at least one serving cell. A base station may notify Information on a configuration of a TA group to a terminal.

Even if a terminal supports a plurality of serving cells in an existing 3GPP LTE/LTE-A system, a single power amplifier may be used for UL transmission. When each UL channel is transmitted in different serving cells, a radio frequency (RF) signal component between cells may not be easily blocked. Especially, when ULs having a big transmit power difference are transmitted simultaneously from another cell, the above issue may become serious. Accordingly, simultaneous transmissions of heterogeneous UL channels are difficult.

However, when it is assumed that TA groups are relatively apart greatly on a frequency, a terminal may be implemented to use a separate power amplifier in order for the UL transmission from each TA group.

Hereinafter, a method of transmitting a plurality of UL channels in a plurality of TA groups will be suggested.

Even when UL channels have different formats or the same format between a plurality of TA groups, a UL channel such as a PUCCH having relatively large transmit power may be transmitted in the same UL subframe. For example, a terminal transmits a PRACH to a first serving cell and simultaneously transmits a PUCCH/PUSCH/SRS to a second serving cell. Or, a terminal transmits an SRS to a first serving cell and simultaneously transmits a PUCCH/PUSCH to a second serving cell.

According to a current 3GPP LTE, a PRACH may not be transmitted in the same subframe simultaneously together with a PUCCH/PUSCH/SRS. According to the suggested present invention, if a plurality of TA groups are configured, a terminal may transmit a PUCCH/PUSCH/SRS to a serving cell belonging to another TA group in the same subframe as the PRACH. That is, it is suggested that UL channels unavailable for simultaneous transmission in the same TA group allows simultaneous transmission in another TA group. A base station may notify whether simultaneous transmission is allowed between a plurality of TA groups to a terminal through an RRC message.

Figure 7:
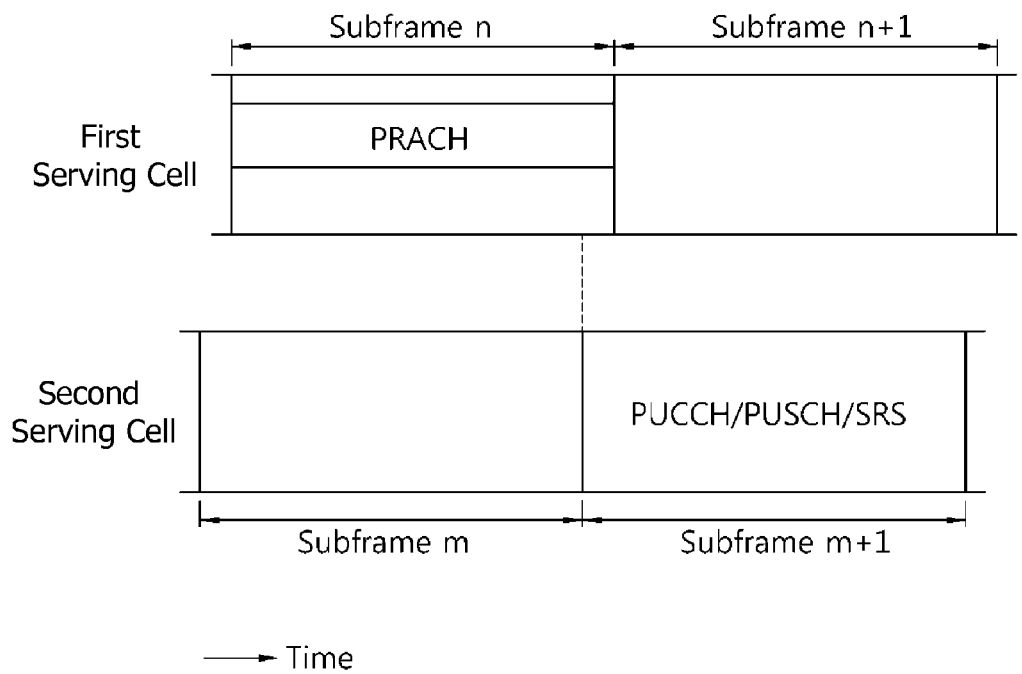
FIG. 7 illustrates UL transmission according to an embodiment of the present

FIG. 7 illustrates UL transmission according to an embodiment of the present invention. A PRACH (or a random access preamble) may be transmitted in one cell of each TA group. A first serving cell belongs to a first TA group and a second serving cell belongs to a second TA group.

When a PRACH is transmitted to the first serving cell, a UL channel, that is, at least one of a PUSCH, a PUCCH, and an SRS may be transmitted to the second serving cell. If a radio resource where a PRACH is transmitted and a radio resource where a UL channel is transmitted are overlapped, total transmit power is required not to exceed the configured maximum transmit power in an overlapping portion. When a PRACH is transmitted to a first serving cell and a PUCCH is transmitted to a second serving cell, let's assume that one of OFDM symbols in which a PRACH is transmitted and one of OFDM symbols in which a PUCCH is transmitted overlap. If the total transmit power of the PRACH and the PUCCH in the OFDM symbol does not exceed maximum transmit power, the PRACH and the PUCCH are transmitted in the overlapping OFDM symbol.

In other cells within a TA group that the first serving cell belongs UL channels may not be transmitted.

Within each TA group in one subframe, a PUCCH may be transmitted to one cell (or a primary cell of a specific TA group) in each TA group. In other cells within a corresponding TA group, a PRACH/SRS/PUSCH may not be transmitted, but in cells belonging to another TA group a RPRACH/SRS/PUSCH may be transmitted.

Within each TA group in one subframe an SRS and/or a PUSCH may not be simultaneously transmitted through the same OFDM symbol in different cells of each TA group. In cells belonging to another TA group an SRS and/or a PUSCH may be transmitted on the same OFDM symbol.

Within each TA group in one subframe a PUCCH may not be simultaneously transmitted to different cells within each TA group but in cells belonging to another TA group a PUCCH may be simultaneously transmitted. Within each TA group in one subframe a PUCCH format may not be simultaneously transmitted to different cells in each TA group, but in cells belonging to another TA group a PUCCH may be simultaneously transmitted. Within each TA group in one subframe different PUCCH formats may not be simultaneously transmitted to different cells in each TA group, but in cells belonging to another TA group different PUCCH formats may be simultaneously transmitted.

A base station may notify a terminal, through RRC signaling, about whether a specific UL channel between the above-described TA groups or a UL physical channel format group is simultaneously transmitted.

An UL channel carrying uplink control information (UCI) such as CSI and ACK/NACK for each TA group may be transmitted to only a cell belonging to a corresponding TA group.

Figure 8:
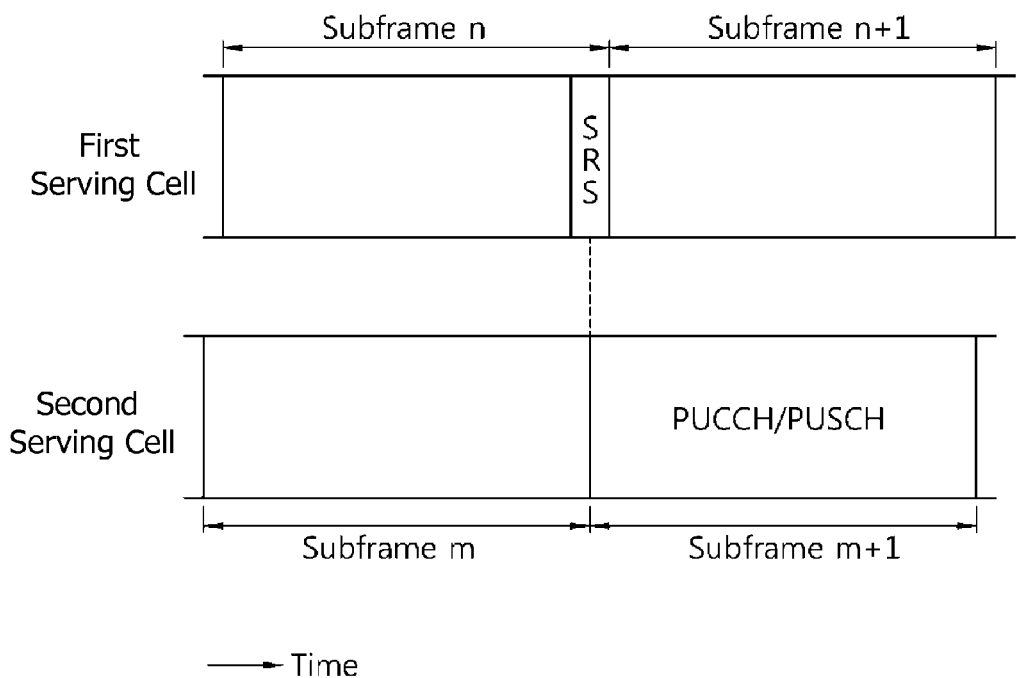
FIG. 8 illustrates UL transmission according to an embodiment of the present invention.

FIG. 8 illustrates UL transmission according to an embodiment of the present invention.

A first serving cell belongs to a first TA group and a second serving cell belongs to a second TA group. An issue is raised when a radio resource used for the transmission of an SRS in the first serving cell and a radio resource used for the transmission of the UL channel of the second serving cell (i.e. at least one of a PUSCH, a PUCCH, and a PRACH) overlap partially or entirely. An SRS may include a periodic SRS and an aperiodic SRS.

For example, the transmission of an SRS is triggered in the last OFDM symbol in a subframe n of the first serving cell and a PUCCH is transmitted in a subframe m+1 of the second serving cell, due to different TAs, the last OFDM symbol of the subframe n and the first OFDM symbol of the subframe m+1 may overlap partially or entirely.

According to an embodiment, if there is the overlapped portion, SRS transmission may be dropped. If an OFDM used for SRS transmission and an OFDM used for UL channel transmission overlap partially, SRS transmission is abandoned.

According to another embodiment, if there is the overlapped portion and the total transmit power of an SRS and a UL channel exceeds the configured maximum transmit power, SRS transmission may be dropped. If the total transmit power of an SRS and a UL channel does not exceed the configured maximum transmit power, an SRS and a UL channel may be transmitted.

According to further another embodiment, if there is the overlapped portion and the total transmit power of an SRS and a UL channel exceeds the configured maximum transmit power, SRS transmission may not be dropped but SRS transmit power may be reduced in order to allow the total transmit power not to exceed the maximum transmit power.

Since an aperiodic SRS dynamically scheduled by a base station is for the base station to obtain a UL channel state at a specific point, it may be more important than another UL channel. Accordingly, when an aperiodic SRS is triggered, it needs to be treated differently from a periodic SRS.

According to an embodiment, if there is the overlapped portion, an aperiodic SRS is transmitted and the transmission of another UL channel in the overlapped portion may be dropped. Additionally, the transmission itself of a UL channel may be abandoned. The UL channel may include a PUCCH carrying CSI.

According to another embodiment, if there is the overlapped portion, an aperiodic SRS is transmitted and the transmit power of another UL channel in the overlapped portion is lowered not to exceed the maximum transmit power. Or, transmit power may be identically lowered all over OFDM symbols where a UL channel is transmitted. The UL channel may include a PUCCH carrying CSI.

Figure 9:
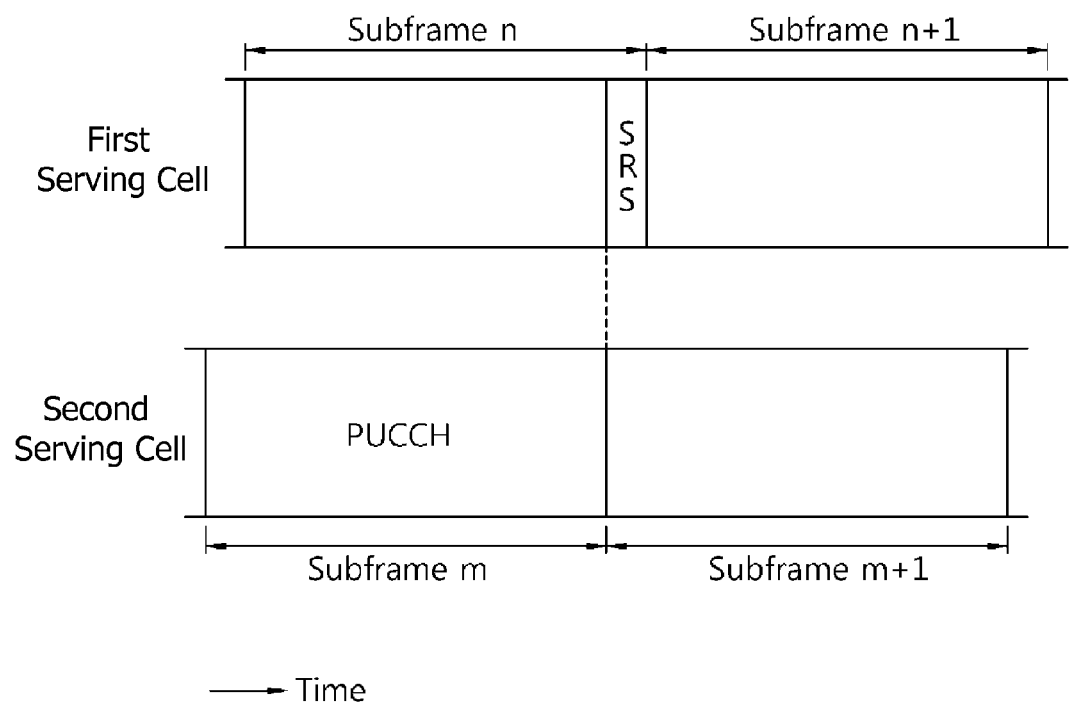
FIG. 9 illustrates UL transmission according to another embodiment of the present invention.

FIG. 9 illustrates UL transmission according to another embodiment of the present invention.

If a TA difference between two TA groups is greater than an SRS transmit interval, an SRS may not overlap a UL channel transmitted in another cell.

Figure 10:
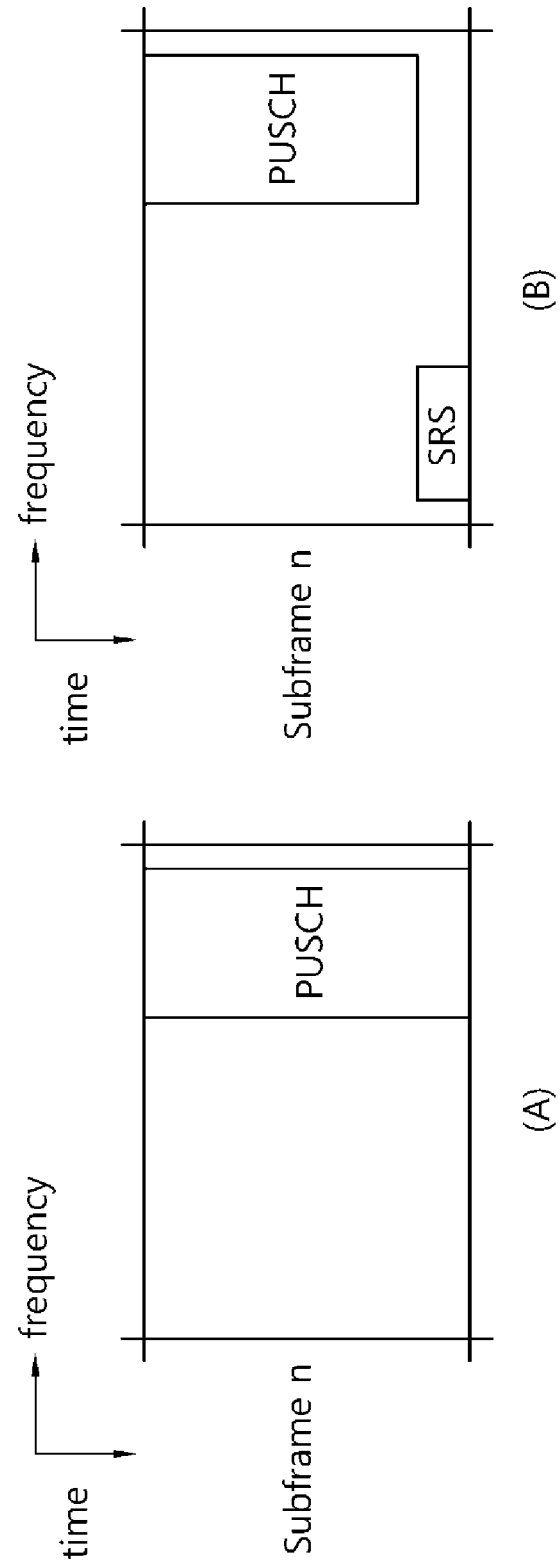
FIG. 10 illustrates PUSCH and SRS transmission according to a typical technique.

Although SRS transmission is triggered on the last OFDM symbol of a subframe n in a first serving cell and a PUCCH is transmitted in a subframe m of a second serving cell, if an OFDM symbol for an SRS and an OFDM symbol for a PUCCH do not overlap, an SRS may be transmitted FIG. 10 illustrates PUSCH and SRS transmission according to a typical technique.

When a terminal transmits an SRS on the last OFDM symbol of one subframe, a PUSCH is not transmitted on the last OFDM symbol. This is to reduce the complexity of terminal UL transmission and changes in amplitude according to UL transmission.

In FIG. 10A, a PUSCH is transmitted over all OFDM symbols in a subframe in which an SRS is not transmitted. In FIG. 10B, when an SRS is transmitted on the last OFDM symbol, it is transmitted over all OFDM symbols except for the last OFDM symbol.

However, when a terminal transmits a UL signal through cells belonging to different TA groups, this operation may cause problems.

Figure 11:
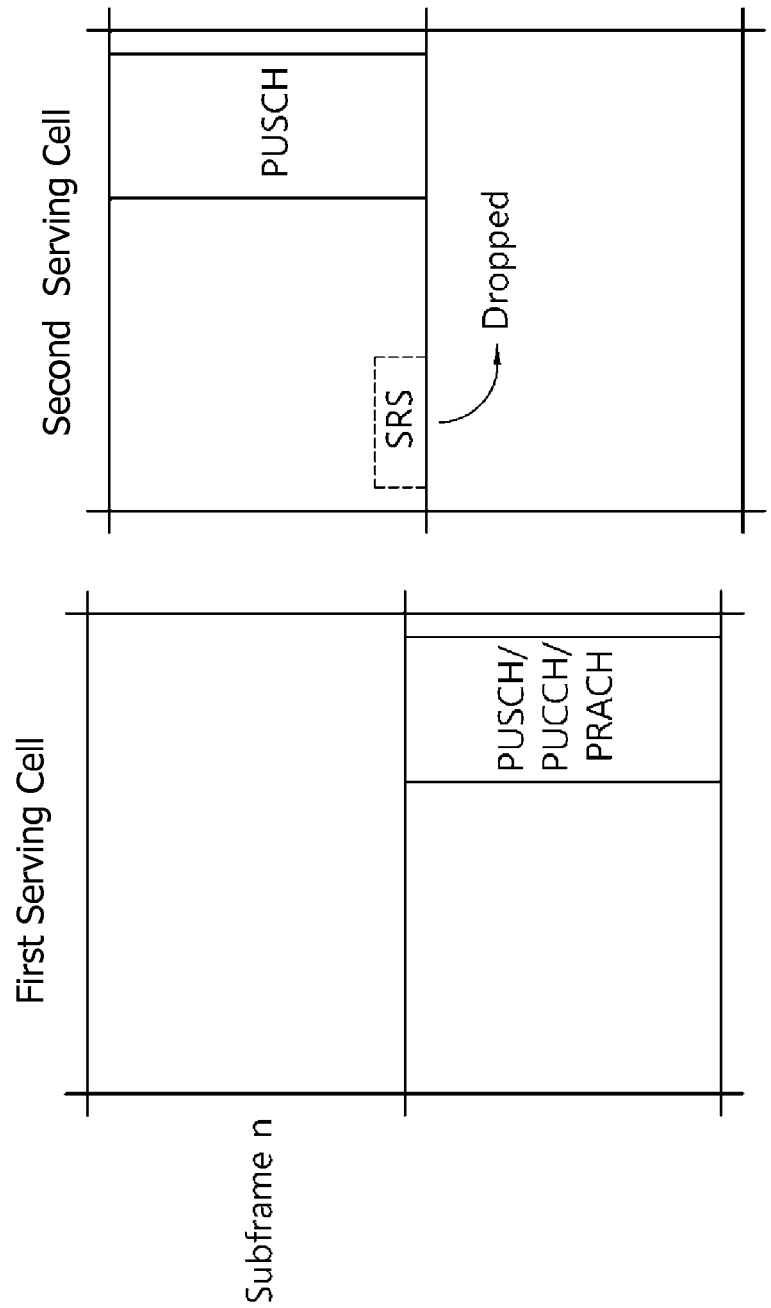
FIG. 11 illustrates PUSCH and SRS transmission when a plurality of TA groups are configured.

FIG. 11 illustrates PUSCH and SRS transmission when a plurality of TA groups are configured.

When a terminal transmits at least one of PUSCH/PUCCH/PRACH in a subframe n+1 of a first serving cell and transmits an SRS on the last OFDM symbol in a subframe n of a second serving cell, let's assume that there is an overlapped portion.

When total transmit power exceeds the maximum transmit power in the overlapped portion, SRS transmission may be abandoned. As a result, since a terminal does not transmit an SRS in a subframe n of a second serving cell, as shown in FIG. 11, a PUSCH is transmitted over all OFDM symbols.

A base station may not accurately determine transmission timing between a first TA group that a first serving cell belongs and a second TA group that a second serving cell belongs. Additionally, the base station may not determine whether the total transmit power of a terminal exceeds the maximum transmit power. Accordingly, the base station may not accurately determine whether there is an overlapped portion and SRS transmission is dropped. Accordingly, when whether a symbol of a PUSCH is transmitted on a corresponding OFDM symbol is determined according to whether a terminal actually transmits an SRS, a base station may have a difficulty in receiving the PUSCH.

Additionally, even if there is an overlapped portion between different TA groups, when it is allowed that a UL signal different from an SRS is transmitted simultaneously, the same difficulty may occur if total transmit power exceeds the maximum transmit power and SRS transmission is abandoned.

Figure 12:
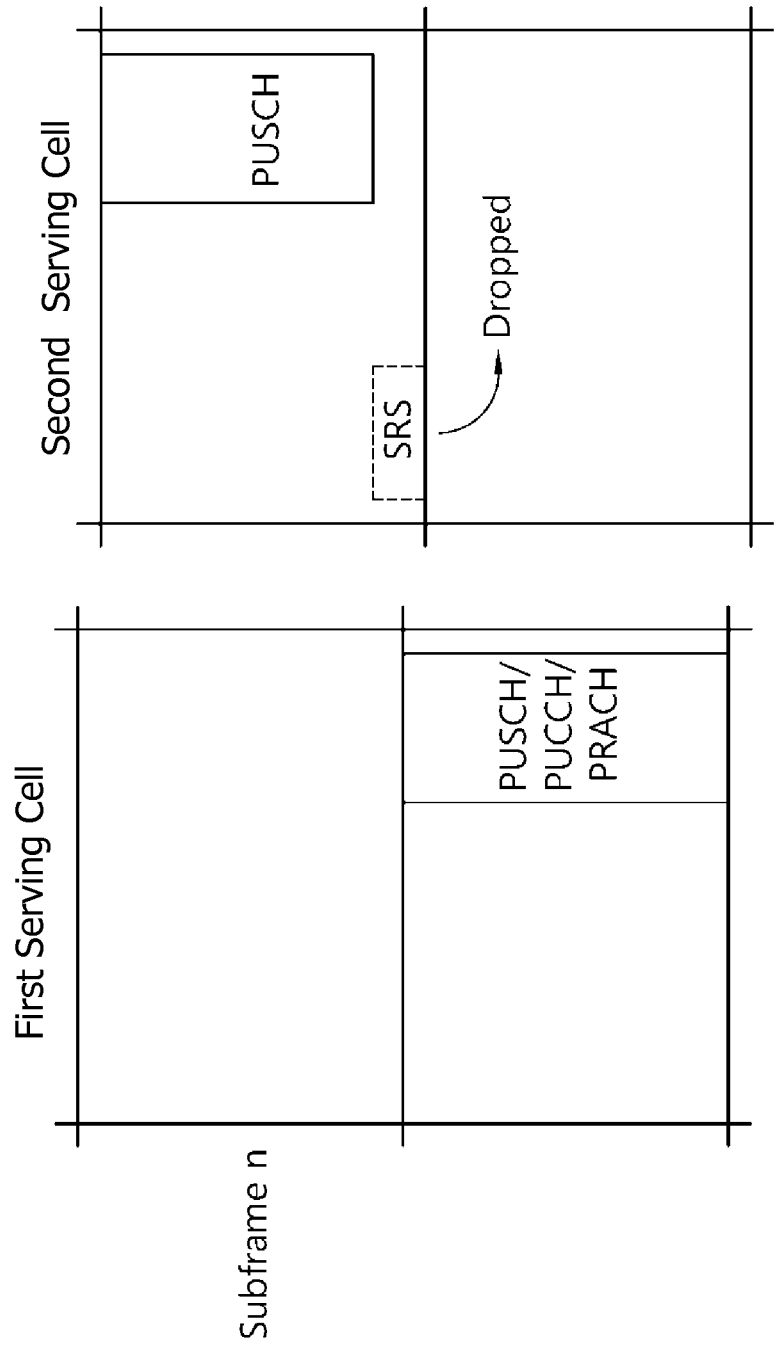
FIG. 12 illustrates UL transmission according to another embodiment of the present invention.

FIG. 12 illustrates UL transmission according to another embodiment of the present invention.

Regardless of whether a terminal actually transmits an SRS in a subframe configured to transmit an SRS, it is suggested that a PUSCH is not transmitted in an SRS symbol.

Or, with respect to all SRS subframes configured to transmit an SRS by each cell or each TA group, a PUSCH may not be transmitted on a corresponding SRS symbol regardless of whether a terminal transmits an SRS.

Regardless of whether there is the overlapped portion, a PUSCH may not be transmitted in a corresponding SRS symbol.

In order to transmit a PUSCH except for an SRS symbol, a code sequence to be transmitted in a PUSCH may be excluded from a generation operation, or after a code sequence is generated under the assumption that a PUSCH is transmitted to a corresponding SRS symbol, the code sequence may not be mapped into a corresponding symbol.

Hereinafter, the transmission of a channel (for example, PUCCH/PUSCH/SRS) different from a PRACH will be described.

When a terminal configured with a first TA group and a second TA group transmits a PRACH to a first serving cell (for example, a secondary cell) belonging to the first TA group and a UL channel to a second serving cell belonging to the second TA group, if the total transmit power of a PRACH and a UL channel exceeds the maximum transmit power, it is necessary to adjust transmit power or abandon transmission.

In a first embodiment, a priority may be put on power allocation in the order of a PUCCH of a primary cell, a PUSCH having UCI, a PRACH of a secondary cell, and another channel, From a channel having a low priority, transmit power is reduced or transmission is abandoned, thereby adjusting total transmit power not to exceed the maximum transmit power.

In a second embodiment, a high priority may be put on a UL channel transmitted through a TA group that a primary cell belongs. Let's assume that a first serving cell belonging to a first TA group is a secondary cell and a second serving cell belonging to a second TA group is a primary cell. When UL channels are simultaneously transmitted to the first and second serving cells, the transmit power of a UL channel transmitted to the first serving cell may be reduced first or its transmission may be abandoned.

In a third embodiment, a higher priority may be put on another UL channel than a PRACH transmitted to the secondary cell. When the transmission of a PRACH to the secondary cell and the transmission of a UL channel to a cell of another TA group overlap, the transmit power of the PRACH may be reduced first or its transmission may be abandoned.

In a fourth embodiment, a higher priority may be put on a PRACH. The reason is that when the transmission of the PRACH is failed, the UL alignment of a corresponding TA group may be delayed. When the transmission interval of a UL channel and the transmission interval of a PRACH overlap, transmit power may be reduced only in the overlapped portion.

In a fifth embodiment, a lower priority may be put on a PRACH. Like a PRACH transmitted through UpPTS in a 3GPP LTE TDD system, there is a PRACH having a short transmission short (this is called a shortened-PRACH (sPRACH). At this point, an entire transmission interval of a PRACH may overlap an entire or part of the transmission interval of a UL channel. When total transmit power exceeds the maximum transmit power, it is inefficient to abandon UL channel transmission or reduce the transmit power of a UL channel.

Transmission may be abandoned or transmit power may be reduced only in a transmission interval overlapping a sPRACH in a corresponding UL channel. The UL channel may be a PUCCH or a PUSCH having CSI.

Or, sPRACH transmission may be abandoned or its transmit power may be reduced. A UL channel overlapping a sPRACH may be a PUCCH having ACK/NACK.

Figure 13:
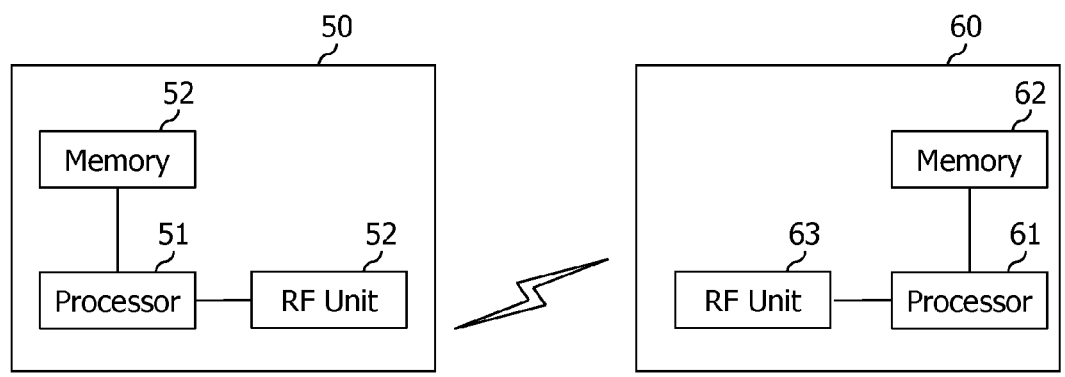
FIG. 13 is a block diagram of a wireless communication system according to an embodiment of the present invention.

FIG. 13 is a block diagram of a wireless communication system according to an embodiment of the present invention.

A base station 50 includes a processor 51, a memory 52, and a radio frequency (RF) unit 53. The memory 52 is connected to the processor 51 and stores a variety of information for operating the processor 51. The RF unit 53 is connected to the processor 51 to transmit and/or receive a radio signal. The processor 51 implements suggested functions, processes, and/or methods. In the above-described embodiments, the serving cell and/or the TA group may be controlled/managed by a base station, and also, operations of one or more cells may be implemented by the processor 51.

The wireless device 60 includes a processor 61, a memory 62, and an RF unit 63. The memory 62 is connected to the processor 61 and stores a variety of information for operating the processor 61. The RF unit 63 is connected to the processor 61 to transmit and/or receive a radio signal. The processor 61 implements suggested functions, processes, and/or methods. In the above-described embodiments, operations of a terminal may be implemented by the processor 61.

The processor may include Application-Specific Integrated Circuits (ASICs), other chipsets, logic circuits, and/or data processors The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for uplink transmission in a wireless communication system, the method performed by a user equipment (UE) and comprising:

performing, by the UE, a first time alignment (TA) to a first cell belonging to a first timing advance group (TAG);

performing, by the UE, a second TA to a second cell belonging to a second TAG;

wherein when a plurality of TAGs including the first and second TAGs are configured and when a subframe is reserved for transmitting a sounding reference signal (SRS), a last orthogonal frequency division multiplexing (OFDM) symbol in the subframe is excluded from performing a coding with respect to a data for a physical uplink shared channel (PUSCH), irrespective of whether or not the SRS is dropped or transmitted in the subframe;

determining, by the UE, whether to transmit or drop the SRS on the subframe even when the last OFDM symbol is excluded from performing the coding and then not used to transmit the PUSCH;

transmitting the SRS on the subframe when the UE determines to transmit the SRS; and dropping the SRS on the subframe when the UE determines satisfaction of all of at least three conditions including:

a first condition specifying that the plurality of TAGs including the first and second TAGs are configured, a second condition specifying that at least one symbol of a first subframe which is used to transmit the SRS toward the second cell of the second TAG is overlapped with a second subframe on which the PUSCH is transmitted toward the first cell of the first TAG, and a third condition specifying that a total uplink transmission power exceeds a maximum value.

2. The method of claim 1, further comprising:
receiving, by the UE, a periodic configuration for the SRS from the first cell or the second cell, the periodic configuration indicating a SRS periodicity and a SRS subframe offset; and
determining, by the UE, a third subframe for the SRS among a plurality of subframes in accordance with the periodic configuration, each of the plurality of subframes including a plurality of OFDM symbols.

3. The method of claim 1, further comprising:
starting, by the UE, at least one time alignment timer (TAT) of a plurality of configured TATs, one of the plurality of configured TATs corresponding to one of the plurality of configured TAGs.

4. The method of claim 3, wherein if none of the plurality of configured TATs is running, the PUSCH and the SRS are not transmitted in the subframe.

5. A user equipment (UE) for uplink transmission in a wireless communication system, the UE comprising:
a radio frequency (RF) unit configured to transmit and receive radio signals; and
a processor operatively coupled with the RF unit and configured to:
perform a first time alignment (TA) to a first cell belonging to a first timing advance group (TAG);
perform a second TA to a second cell belonging to a second TAG;
wherein when a plurality of the TAGs including the first and second TAGs are configured and when a subframe is reserved for transmitting a sounding reference signal (SRS), a last orthogonal frequency division multiplexing (OFDM) symbol in the subframe is excluded from performing a coding with respect to a data for a physical uplink shared channel (PUSCH), irrespective of whether or not the SRS is dropped or transmitted in the subframe;

determine whether to transmit or drop the SRS on the subframe even when the last OFDM symbol is excluded from performing the coding and then not used to transmit the PUSCH;

control the RF unit to transmit the SRS on the subframe when the processor determines to transmit the SRS; and control the RF unit to drop the SRS on the subframe when the processor determines satisfaction of all of at least three conditions including:

a first condition specifying that the plurality of TAGs including the first and second TAGs are configured, a second condition specifying that at least one symbol of a first subframe which is used to transmit the SRS toward the second cell of the second TAG is overlapped with a second subframe on which the PUSCH is transmitted toward the first cell of the first TAG, and a third condition specifying that a total uplink transmission power exceeds a maximum value.

6. The UE of claim 5,
wherein the RF unit is further configured to receive a periodic configuration for the SRS from the first cell or the second cell, the periodic configuration indicating a SRS periodicity and a SRS subframe offset; and
wherein the processor is further configured to determine a third subframe for the SRS among a plurality of subframes in accordance with the periodic configuration, each of the plurality of subframes including a plurality of OFDM symbols.

7. The UE of claim 5, wherein the processor is further configured to start at least one time alignment timer (TAT) of a plurality of configured TATs, one of the plurality of configured TATs corresponding to one of the plurality of configured TAGs.

8. The UE of claim 7, wherein if none of the plurality of configured TATs is running, the PUSCH and the SRS are not transmitted in the subframe.

\* \* \* \* \*